US 11,216,576 B1

(12) United States Patent
Mare et al.

(10) Patent No.: US 11,216,576 B1
(45) Date of Patent: Jan. 4, 2022

(54) SYSTEMS, METHODS, AND COMPUTER-READABLE MEDIA FOR UTILIZING ANONYMOUS SHARDING TECHNIQUES TO PROTECT DISTRIBUTED DATA

(71) Applicant: TECHNOLOGY INNOVATION INSTITUTE, Masdar (AE)

(72) Inventors: Septimiu F. Mare, Timisoara (RO); Najwa Aaraj, Abu Dhabi (AE); Marcos Manzano, Abu Dhabi (AE); Alvaro Garcia, Abu Dhabi (AE)

(73) Assignee: TECHNOLOGY INNOVATION INSTITUTE, Madar (AE)

( * ) Notice: Subject to any disclaimer, the term of this patent is extended or adjusted under 35 U.S.C. 154(b) by 0 days.

(21) Appl. No.: 17/374,097

(22) Filed: Jul. 13, 2021

Related U.S. Application Data

(62) Division of application No. 17/196,400, filed on Mar. 9, 2021, now Pat. No. 11,087,017.

(51) Int. Cl.
*H04L 29/06* (2006.01)
*G06F 21/62* (2013.01)
*G06F 16/953* (2019.01)

(52) U.S. Cl.
CPC ........ *G06F 21/6218* (2013.01); *G06F 16/953* (2019.01); *H04L 63/0421* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2006/0206793 A1* | 9/2006 | Komamura | G06F 3/1222 715/205 |
| 2011/0138475 A1 | 6/2011 | Gordon et al. | |
| 2011/0271344 A1 | 11/2011 | Unagami et al. | |
| 2015/0142733 A1* | 5/2015 | Shadmon | G06F 16/21 707/609 |
| 2015/0172412 A1* | 6/2015 | Escriva | G06F 16/182 709/202 |
| 2018/0060037 A1* | 3/2018 | Johnson | G06F 7/08 |
| 2019/0356650 A1 | 11/2019 | Leavy et al. | |
| 2020/0081874 A1* | 3/2020 | Annamalai | G06F 16/22 |
| 2020/0242156 A1* | 7/2020 | Liu | G06F 16/81 |
| 2021/0194677 A1 | 6/2021 | Pourzandi et al. | |

* cited by examiner

*Primary Examiner* — Joseph P Hirl
*Assistant Examiner* — Hassan Saadoun
(74) *Attorney, Agent, or Firm* — Van Court & Aldridge LLP (57) ABSTRACT

Systems, methods, and computer-readable media for protecting distributed data are provided. The data is distributed according to a time-based shard distribution scheme that splits data into multiple pieces to prevent an attacker who successfully breaches a terminal device from reassembling the pieces.

16 Claims, 9 Drawing Sheets

SYSTEMS, METHODS, AND COMPUTER-READABLE MEDIA FOR UTILIZING ANONYMOUS SHARDING TECHNIQUES TO PROTECT DISTRIBUTED DATA

CROSS-REFERENCE(S) TO RELATED APPLICATIONS

This application is a divisional of U.S. patent application Ser. No. 17/196,400 filed Mar. 9, 2021 (now U.S. Pat. No. 11,087,017), which is incorporated by reference in its entirety.

TECHNICAL FIELD

This disclosure relates to systems, methods, and computer-readable media for protecting distributed data.

BACKGROUND

Data breaches have become a regular and costly occurrence for companies and individual who desire secure storage of their data. Solutions exist to protect the channel used for end to end data communications, but the source and destination terminals are still prone to attack. More effective techniques to protect data stored at terminal devices are needed.

SUMMARY

Systems, methods, and computer-readable media for protecting distributed data are provided. The distributed data is protected using anonymous sharding techniques. Data is represented on a timeline and entries are sharded into multiple pieces to prevent an attacker from acquiring sufficient shards to reassemble any point of the timeline.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which.

DETAILED DESCRIPTION

Systems, methods, and computer-readable media for protecting data that are distributed across several servers are provided and described with reference to FIGS. 1-9. The data is distributed according to anonymous sharding techniques according to embodiments discussed herein.

As defined herein, a communications stream refers to records that are generated during use of a communications system. The records represent a communications history of the communications stream that are stored accordance with embodiments discussed herein. For example, a communications stream can be a chat conversation between two users.

As defined herein, an epoch refers to a defined time interval within a communications stream. Multiple epochs can virtually represent a timeline of the communications stream. The epochs are arranged in a time-ordered contiguous fashion to represent the timeline of the communications stream.

Each epoch can be associated with a null data page or one or more data pages (or other unit of storage) of communications stream data. Data pages are being referred to herein to represent a discrete chunk of data that is stored. In some embodiments, data pages can be replaced with other units of data storage such as blocks, sectors, or files. In some embodiments, a data page is a virtual representation of data limited by size. A null data page represents that no data has been associated with an epoch.

Data pages can be classified as relatively old or relatively new. Relatively old data pages may be considered least recently used (LRU) communications stream records or historical records. Relatively new data pages may be considered most recently used (MRU) communications stream records, current records, or unread records.

As defined herein, a shard unit refers to a portion of a data page that has been split into multiple pieces. Each data page is divided into multiple data shards and each data shard is assigned an address. The shard unit includes a data shard and an address.

As defined herein, a terminal device or server refers to an access point within a communications system that is being used by a user to engage in a communications stream. The terminal device can be an owner of the data associated with a communications stream.

As defined herein, a remote sever or remote peer refers to equipment that stores shard units that have been distributed by a shard distribution scheme according to embodiments discussed herein.

The advancements of cryptography and continuous evolution of security protocols and techniques, especially in end-to-end (E2E) encrypted systems, has forced attackers to devise more sophisticated attacks, especially when targeting the cryptographic components. Over the past 20 years attacks have shifted from a cryptographic point to a protocol vulnerability one to a targeted attack on the terminal device. With the evolution of hardware cryptographic coprocessors, secure enclaves or trusted execution environments, comes an added security benefit that more and more solution developers use out-of-the-box when designing secure communication systems. Most E2E secure communication systems are protected against man-in-the-middle (MiTM) attacks, employing techniques such as certificate pinning, second-factor agreements and mutual public key whitelisting, or ephemeral cryptographic keys, to assure that the channel is secure. While this effectively protects the channel itself, attackers have shifted their focus towards the weakest link in this process, which is very often the terminal device itself.

Terminal devices act like data processors that decapsulate encrypted information and store it locally. The information stored locally, whether encrypted or not is the main target of an attacker as it bypasses the need to compromise the channel and accesses the data at its source or destination. Mechanisms to secure the data at rest have not evolved at the same pace at which cryptographic methods and communication protocols have. That is, the communication records history is typically kept in an encrypted database (contiguous block) that is loaded and decrypted in memory by a given application. The database is the desired attack point in a targeted attack as it is the simplest one to mount. If the database is compromised, the attacker may have access to the entire communication history. Such an attack assumes the attacker can exfiltrate the key(s) from memory and capture the data either in transit or by remotely accessing the terminal device's communication history database. This database is what attackers target as it offers a plethora of weak points. For example, one weak point is the decryption key memory location as the database requires the key to reside in memory for the entire duration of reading/writing cycles.

Another weak point is improper key management when discarding; keys are freed from memory in ways that is out of the developer's control. Database internals are rarely vetted from a security perspective, especially in open source solutions.

Yet another weakness is improper memory management as most common databases use open source in the form of precompiled dynamic or static libraries. The encryption layer is typically a plugin that registers itself as a crypto operation provider to the database engine. This creates a chain of shared and owned memory zones where cryptographic material can leak due to excessive copying between dependencies, improper freeing from a cryptographic point, improper locking of shared memory zones, etc.

Yet another weakness is database caching mechanisms. Databases are often designed to allow quick interrogation of data. For this, databases utilize large memory allocations to memory mapped (MMAP) pages of the database table stored at rest. Significant speed differences exist between permanent and temporary storage, and as a result, databases use cache files as a way of moving least-recently used (LRU) pages back to the permanent storage. These pages get written to cache files that wait in queue to migrate back into the database body, freeing the memory afterwards. Any premature freeing of resources can cause these processing artifacts to leak information. Not being in control over the sanitization of extra information the databases generate is a potential source of system penetration.

Another weakness are memory overflows due to undiscovered bugs. This weakness is exposed during sophisticated attacks, where attackers craft special messages that cause the database engine to execute arbitrary code, out of the context of the current execution thread.

Yet another weakness is contiguous storage of entire communications stream. From a usage perspective, the communications stream can be split in two: most recent communication and historical entries. From a statistical perspective, the terminal device users rarely go back in history, and if, only to search for previous information, which are rare events. Storing the entirety of communication puts the user at risk in case of a compromise as the entire communication history will be accessible to an attacker.

Embodiments discussed herein use a time-based data shard distribution scheme to store the historical data in a distributed manner on a network of storage peers with the objective of limiting the impact of any information leak to the most recent communications. The embodiments discussed herein rework the notion of a database in the sense of time-groupable communication streams and employs a remote data distribution system that is addressable only from the originating terminal device. The time-based data shard distribution system is operative to classify the communications stream into several epochs (by time), into data pages (by size), and into data shards (by sharding configuration).

The time-based data shard distribution scheme embodiments discussed herein can reduce any exfiltrated information to a negligible amount by distributing the historical entries among a network of storage peers (e.g. servers or other type of devices). The time-based data shard distribution scheme scatters historical entries split into data shards and stored among connected storage peers giving the end terminal non-repudiation over its data. In addition, the time-based data shard distribution scheme employs a deterministic addressing model, known only to the issuing party, while at the same time utilizes data obscurity, making it impossible for storage peers to correlate the shards together. The scheme used by embodiments discussed herein provide (1) a database system tailored for securely storing communication data, (2) an anonymous addressing model that is known only to the issuing party, (3) a peer-to-peer distributed network of storage nodes where the communicating endpoints can securely store their historical entries, (4) and a mitigation technique against targeted attacks.

Figure 1:
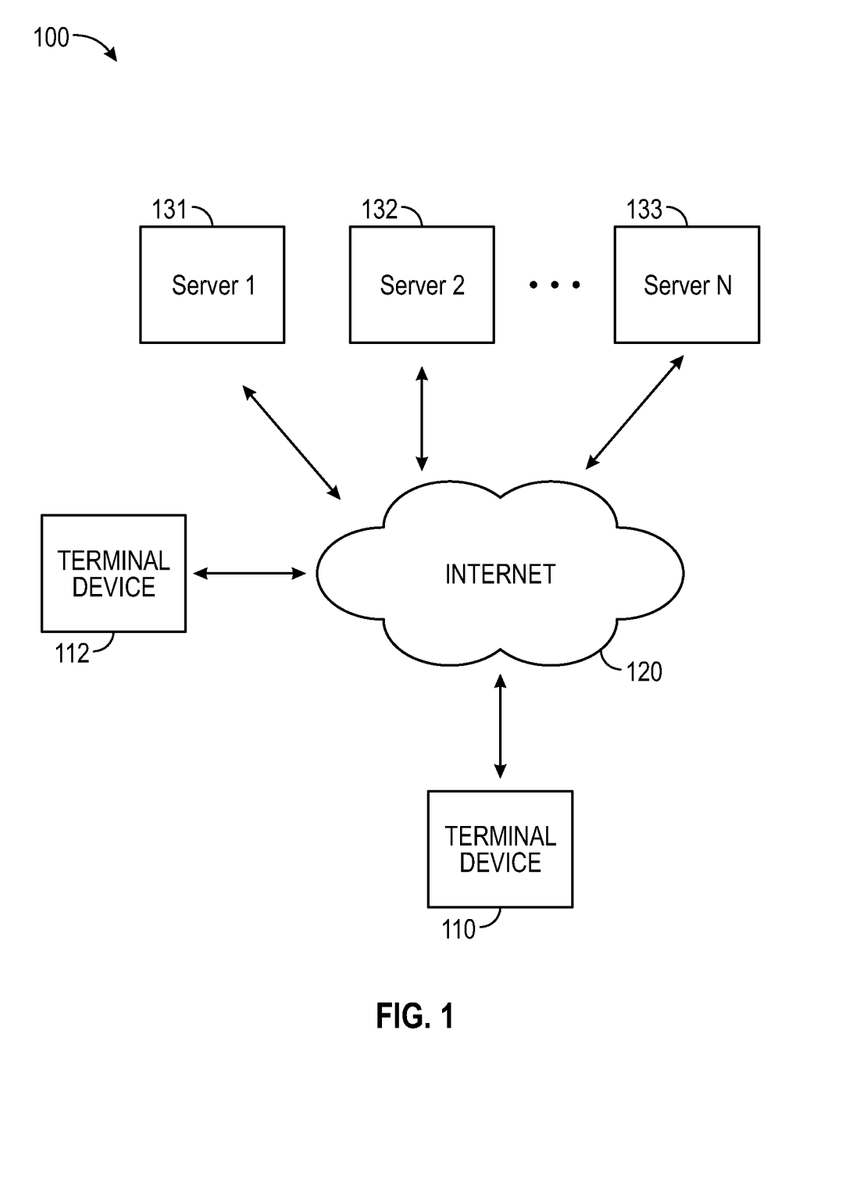
FIG. 1 shows a schematic diagram of an example system in accordance with an embodiment.

FIG. 1 shows a schematic diagram of an example system 100 in accordance with an embodiment. System 100 can include terminal device 110, terminal device 112, internet 120, and servers 131-133. A communications stream can exist between terminal device 110 and terminal device 112 or with any one or more of servers 131-133. The communications stream can include incoming and outgoing communications. For example, outgoing communications can originate with terminal device 110 and be transmitted to terminal device 112 or one or more of servers 131-133 and incoming communications can be transmitted from terminal device 112 or one of servers 131-133 and received by terminal device 110. For example, terminal device 110 can be a first smart phone that is engaged in a chat communication with a second smart phone (represented by device 112). In another example, terminal device 110 can be uploading pictures or video to cloud storage hosted by one of servers 131-133.

Terminal device 110 may represent a device that is being used by a user to access files or engage in a communications scheme. Servers 131-133 may represent devices that are located remote to terminal device 110 and can serve as communications endpoints with respect to terminal device 110 or storage locations for later retrieval. Internet 120 can represent any computer network that enables communications among devices 110 and 112 and servers 131-133. For example, the computer network can be a public network or a private network.

Figure 2:
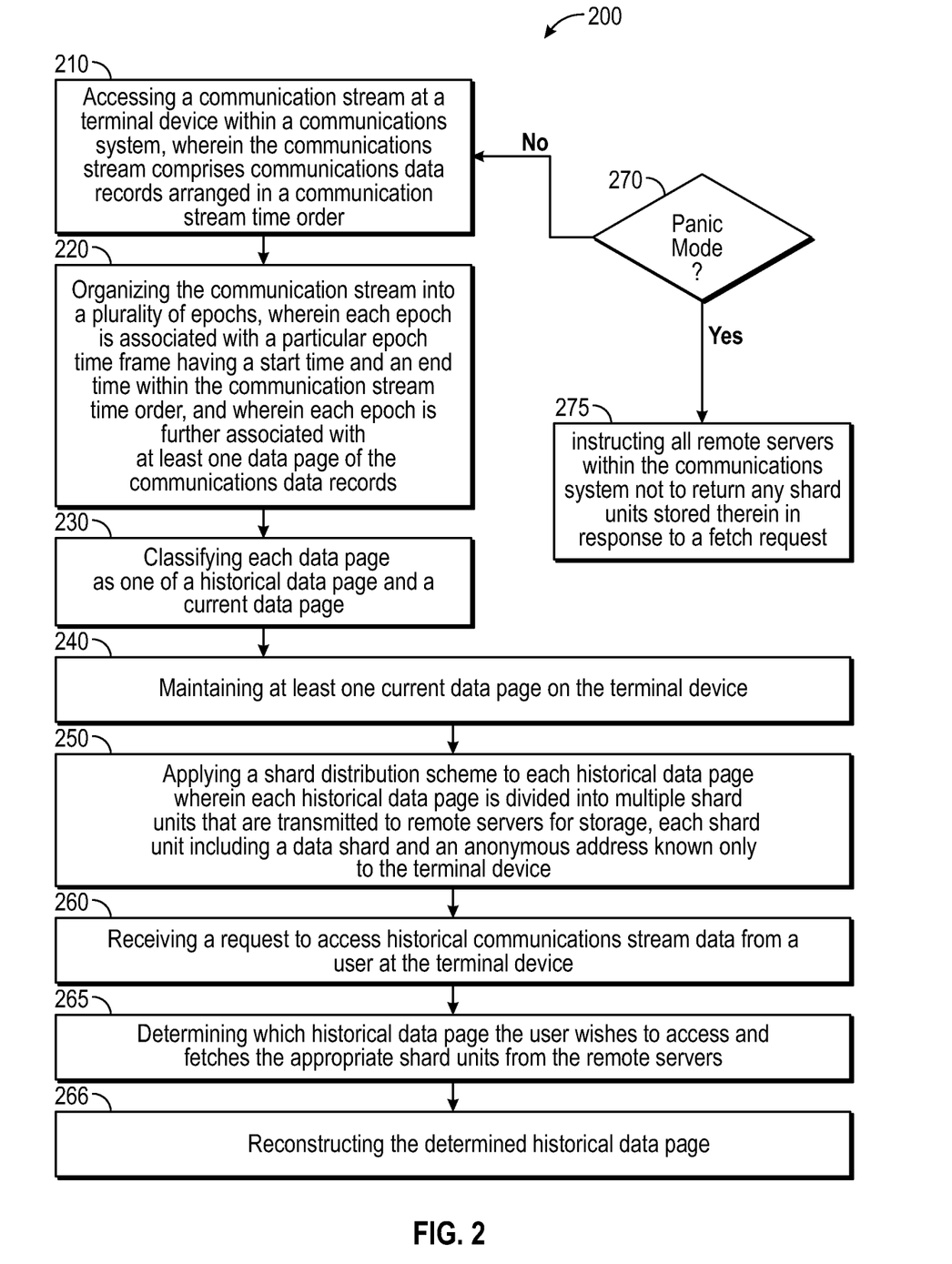
FIG. 2 shows a process of how the time-based shard distribution scheme operates according to an embodiment.

FIG. 2 shows process 200 showing how the time-based shard distribution scheme operates according to an embodiment. Starting at step 210, a communications stream is accessed within a system (e.g., system 100 of FIG. 1). The system can include a terminal device (e.g., server 110) or device and several remote servers (e.g., servers 131-133). The communications stream can exist in encrypted or unencrypted format. Regardless of the encryption format of communications stream data, the time-based data shard distribution scheme treats all data history as raw data. This decouples the shard distribution scheme from any cryptographic overly system being used to further secure the data. Best practices typically recommend usage of encryption layers implemented on top of the shard distribution scheme. The system can include endpoints/nodes acting like cryptographic black boxes where the communication network is not trustworthy. The network and servers in between endpoint terminal devices act as relay servers to direct messages towards the intended destination. These communication systems possess a communication timeline where messages are ordered according to the time they were created and/or sent. Thus, the communications stream includes communications data records arranged in a communication stream time order.

The communications data records (e.g., messages) have a validity for the end user until they get read by the user, after which they become historical records. Several system designs allow record deletion or automatic expiration, but this impacts the user experience as most users use different solutions that compromise security for usability. For purposes of the time-based data shard distribution scheme, the communications stream is treated a single stream analyzed with respect to one terminal server or device.

At step 220, the communication stream is organized into a plurality of epochs based on time and size of the records within the communication stream. Each epoch is associated with a particular epoch timeframe having a start time and an end time within the communication stream time order, and each epoch is further associated with at least one data page of the communications data records or a null data page (which indicates no data has been received in connection with this particular epoch). The epochs can be defined on a global system basis or per-user basis and are associated with all records sent and received between the boundaries of a particular epoch timeline, measured in absolute time. Unix time is one example that can be used, as it counts the seconds since a genesis timestamp defined by the standard itself (01.01.1970 12:00 00 AM). For example, if the epoch size is 30 minutes, each epoch intrinsically exists from an addressing point, every 1800 seconds.

Each epoch can be associated with one or more data pages (or other storage unit) of communications stream data or a null data page. Different endpoints or terminals within a communications system may store different amounts of data for a given epoch. For example, one epoch may be associated with one Gigabyte of data, whereas another epoch may be associated with three Gigabytes of data. In order to keep data management consistent across terminal devices and to ensure fast and efficient management of data, the data can be stored in discrete sized chunks, referred to herein as pages. As an example, each data page may have a maximum size (e.g., 1 Gigabyte). Thus, the epoch having one Gigabyte of data may have one data page, whereas the 3 Gigabyte epochmay have three data pages. An epoch having no data associated with it may have a null data page.

At step 230, the data pages are classified either as a historical data pages or current data pages. Historical data pages are associated with relatively old communications stream data or data that has already been read or accessed. Current data pages are associated with relatively new communications stream data or data that has not been read nor accessed. In order to minimize data leakage in case of a successful attack, the time-based data shard distribution scheme instructs the terminal device to send historical data pages for storage on remote locations (e.g., remote servers or peers), while only keeping current data pages on the terminal device (step 240).

At step 250, shard distribution scheme can be applied to historical data pages, wherein each historical page is divided into a multiple shard units that are transmitted to remote servers for storage. Each shard unit includes a data shard and an anonymous address. The anonymous address is known only to the terminal device and includes an epoch address corresponding to the epoch associated with the historical data page being split by the shard distribution scheme. The anonymous addresses are generated in a deterministic way on the terminal device and cryptographically transformed into "random" data such that any outside party cannot correlate without having the crypto primitives used initially.

After the shard units for each historical data page are stored at the remote servers, a user may desire to access historical communications stream data at step 260. At step 265, the terminal device can determine which historical data page the user wishes to access and fetches the appropriate shard units from the remote servers. After the shard units are fetched, the historical data page is reconstructed at step 266, thereby enabling the user to view the contents of the historical communications data stream.

If at any time a panic mode has been invoked (step 270)—indicating an attack event—all remote servers are informed of the panic event and are instructed not to return any shard units stored therein in response to a fetch request (step 275). This reduces the data spillage to the minimum, giving the attacker a view only into the most recent communication window, therefore minimizing the effects and implications of the attack. The panic mode may access a variety of second factor channels to inform the remote storage peers (e.g., servers) of the breach. Panic mode can operate asynchronously with respect to steps 210, 220, 230, 240, 250, 260, and 265. If there is no panic mode, process 200 can continue at step 210.

It should be understood that the steps shown in FIG. 2 are exemplary and that additional steps may be added, steps may be omitted, and the order of the steps may be rearranged.

Figure 3:
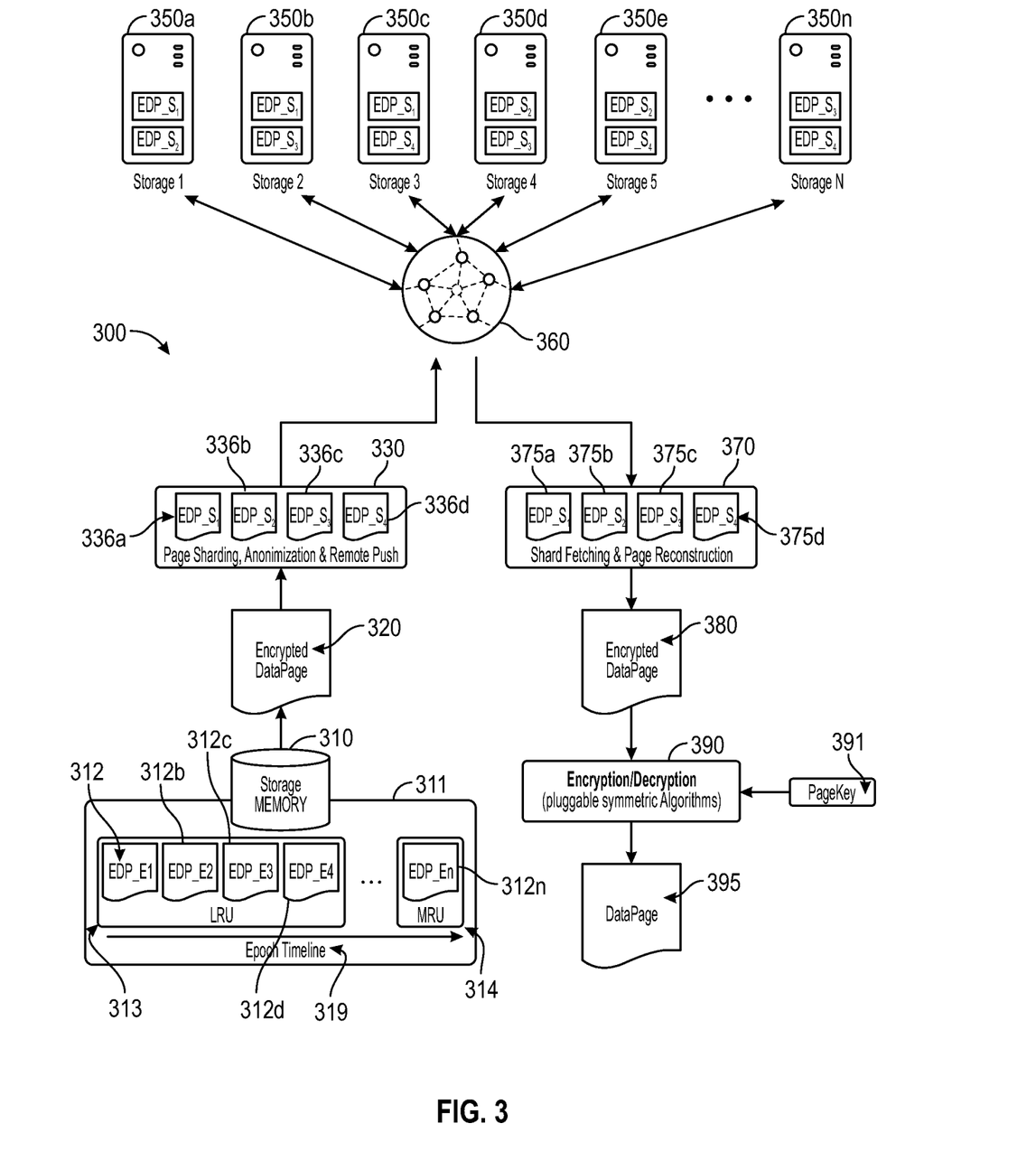
FIG. 3 shows an illustrative high-level system schematic of the sequence from creation, push and retrieval using the time-based shard distribution scheme according to an embodiment.

FIG. 3 shows an illustrative high-level system 300 schematic of the sequence from creation, push and retrieval using the time-based shard distribution scheme according to an embodiment. Messaging data or communication stream data can be stored at storage 310. Storage 310 may represent memory such as RAM. A more detailed view of contents stored in storage 310 are shown in detail box 311. Detail box 311 shows that the communications stream is stored in historical data pages 313 (e.g., also referred to as least recently used (LRU) pages) and current data page 314 (e.g., also referred to as most recently used (MRU) page) in accordance with epoch timeline 319. Epoch timeline 319 denotes time-based sequencing of a communications stream, which is divided into epochs 312a-312n. Epochs 312a-312n each have an epoch address, denoted as EDP_Ex, where Ex corresponds to a particular epoch. Each of epochs 312a-312d can be associated with one or more data pages (only one data page is shown in FIG. 3 to avoid overcrowding the drawing). If desired, the data pages can be encrypted data pages. Epoch 312n can be associated with a null data page or one or more data pages.

Current data page 314 may be retained in storage 310 until it is determined that current data page 314 should transition to become a historical page 313, which are then transferred to remote servers using the shard distribution scheme according to embodiments discussed herein. Thus, in the event of an attack, current pages 314 are the only pages that an attacker could obtain.

Historical data pages 313 represent data that is protected using the shard distribution scheme. Historical data pages 313 may be historical entries that are rarely used or accessed unless a user at the terminal device browses the communication stream history. These historical entries are processed through the shard distribution scheme according to embodiments discussed herein and are pushed onto remote servers to prevent an attacker accessing the communication history.

A size of each page in data pages 313 or 314 is defined either as a global system-wide parameter or individual end terminal configuration (local) parameter. System 300 can use a mix of both global and local, as it does not influence the way data is stored, provided the end terminals can calculate the epoch addresses.

System 300 may encrypt each historical page 313 to provide Encrypted Data Page (EDP) 320 before each historical data page, now EDP 320, is processed for decomposition in block 330. It should be understood that historical data pages 313 and current data pages 314 may already be encrypted data pages (e.g., encrypted as part of a security process in handling data). Block 330 handles page sharding, anonymization and remote push. Block 330 can generate an encrypted data page address for EPD 320 based on terminal device secrets (e.g., a terminal device ID) and an epoch address associated with EPD 320. Block 330 splits Encrypted Data Page 320 into shards 336a-d. The technique of shard splitting can vary from Adaptive Shamir to RAID or other algorithms used in data redundant systems. The result of this split is the creation of data shards, denoted EDP_Sx (Encrypted Data Page Shard x). The address/filename of shards 336a-d is anonymized using cryptographic operations by mixing in terminal device-owned secrets (e.g. KDF). This step breaks the address relationship and shard correlation for any outside system component. The security model here relies on omission of cryptographic primitives that creates non-repudiation between shards but also in relationship with the origin (terminal device). The encrypted data page shards are transmitted via network 360 and stored on remote storage servers 350a-n for later retrieval by the originating terminal device.

When a user wishes to access history data of a communications stream, the user will specify on the terminal device which historical pages of the communications stream he or she wishes to access. Based on which historical pages are to be accessed, the system at block 370 can determine the appropriate encrypted data page addresses remote servers 350a-n to provide the shards corresponding to those anonymous encrypted data page addresses. In normal working conditions—where the system is not in panic mode—remote servers 350a-n can provide the shards to the calling party. Fetched shards 375a-d are ordered and assembled to reconstruct encrypted data page 380. The terminal device can use decryption block 390 to decrypt encrypted data page 380 using Page Key 391 to thereby render unencrypted Data Page 395.

Figure 4:
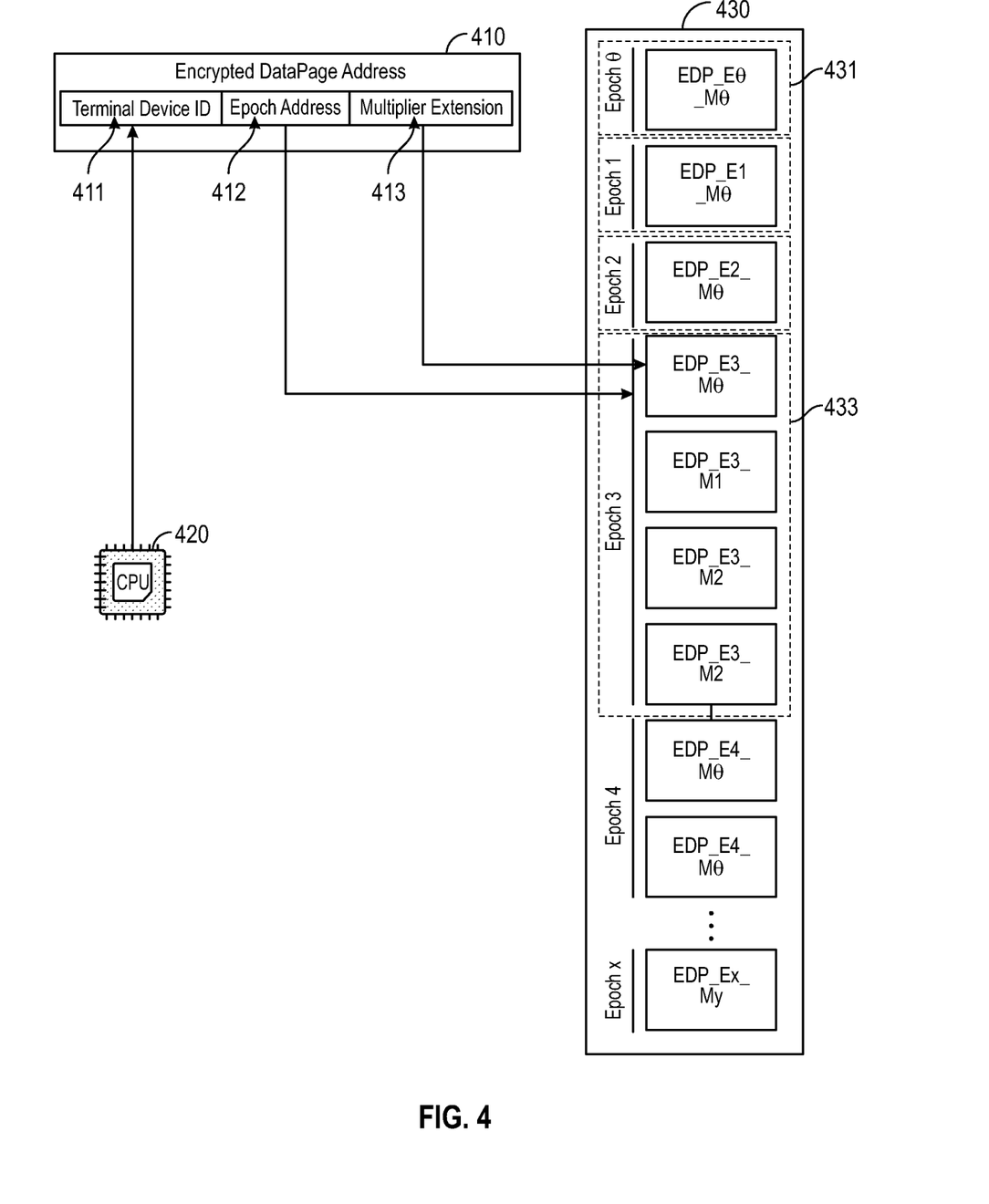
FIG. 4 shows an illustrative block diagram of providing addresses for epoch data pages according to an embodiment.

FIG. 4 shows an illustrative block diagram of generating an encrypted data page address for any data page according to an embodiment. Encrypted data page address 410 can include terminal device ID 411, epoch address 412, and multiplier extension 413. Terminal device ID 411 represents a unique system-wide device identifier that links the hardware 420 to encrypted data page address 410. Terminal device ID 411 can be a physical hardware identifier, a cryptographic public key, a hash of cryptographic public keys (if keys are large in size), or a custom client-side generated secret.

Epoch address 412 can represent a counter address that points to an epoch time slot within the epoch timeline of a communication stream. As shown in FIG. 4, epoch address 412 corresponds to Epoch 3 within communication stream 430. Communication stream 430 includes a timeline of epochs, shown as epochs 0-X, where each epoch represents a time interval within the timeline of the communications stream. An epoch is a logical grouping according to which all incoming/outgoing communications are grouped according an appropriate time interval within the timeline of the communications stream. Thus, when a new message arrives, that message is assigned to an appropriate epoch address depending on the timestamp of that message. The exact address is determined by taking the absolute time representation and dividing it with the desired timespan. For example, the address may be a modulo-type division representation wherein the epoch address is equal to the floor of the message timestamp divided by epoch size). This enables database indexing, caching or any migration operations to be transparent, favoring the more directed placement of data based on deterministic addressing model as opposed to queued based approach. An epoch address can be associated with one or more data pages. For example, Epoch 3 is associated with data pages EPD_E3_M0, EPD_E3_M1, and EPD_E3_M2, which are delineated by dashed line box 433. Epoch 0 is associated with data page EPD_E0_M0, which is delineated by dashed line box 431.

A general purpose of epoch addressing is to keep data grouped into manageable parts. However, in there may be situations where the terminal device receives or sends more messages that are to be contained in a single page, as the size of the page would become too large for ease of file management. As a further constraint, each data page is set to a maximum size. This page size constraint prevents any given epoch from being associated with an extra-large page that exceeds the maximum page size. Thus, instead of having one large page for a given epoch, multiple pages (none of which exceed the maximum size) can be associated with the epoch. This approach maintains granularity of pages within each epoch to the desired value, while not inflicting any performance degradation when executing distribution or fetching of such data pages.

Multiplier extension 413 is a counter for epochs having multiple associated data pages. The counter for multiplier extension 413 corresponds to each data page associated with the epoch container. For example, epoch 3 has four pages, designated by M0, M1, M2, and M3 for EDP_E3.

Page entries within the communication stream 430 use the notation EDP_Ex_My, which represents Encrypted Data Page for Epoch x with page Multiplier y. As an example, the following Base64-encoded full address, MDM1YjJkNzQtOWZkMWQxLWYx, translates to the 035b2d74-44303-f1, where "035b2d74" represents an arbitrary unique ID; "44303" represents a hexadecimal representation of the number 279305, which denotes an epoch with the epoch duration of 30 minutes (1800 seconds), resulting in a UNIX time of 270305*1800=502749000, which corresponds to 6 Dec. 1985 @ 8:30 PM (UTC); and "f1" indicates that the epoch data page is spanned across multiple sub-pages. For example, if the page size limit is set to 1 MB, 0xF1 indicates the 241th megabyte page. The full address for the above example is interpreted as follows: sub-page #241, corresponding to epoch time 6.12.1985 at 8:30 PM UTC, for client with system-unique ID 035b2d74. It should be appreciated that this address represents a plaintext version of it and is computed on the terminal device. This address is not the end address that is used to store anything remotely as it can be decoded by any external party. A technique offering non-repudiation introduced to break this linkability for an external observer is now discussed.

Figure 5:
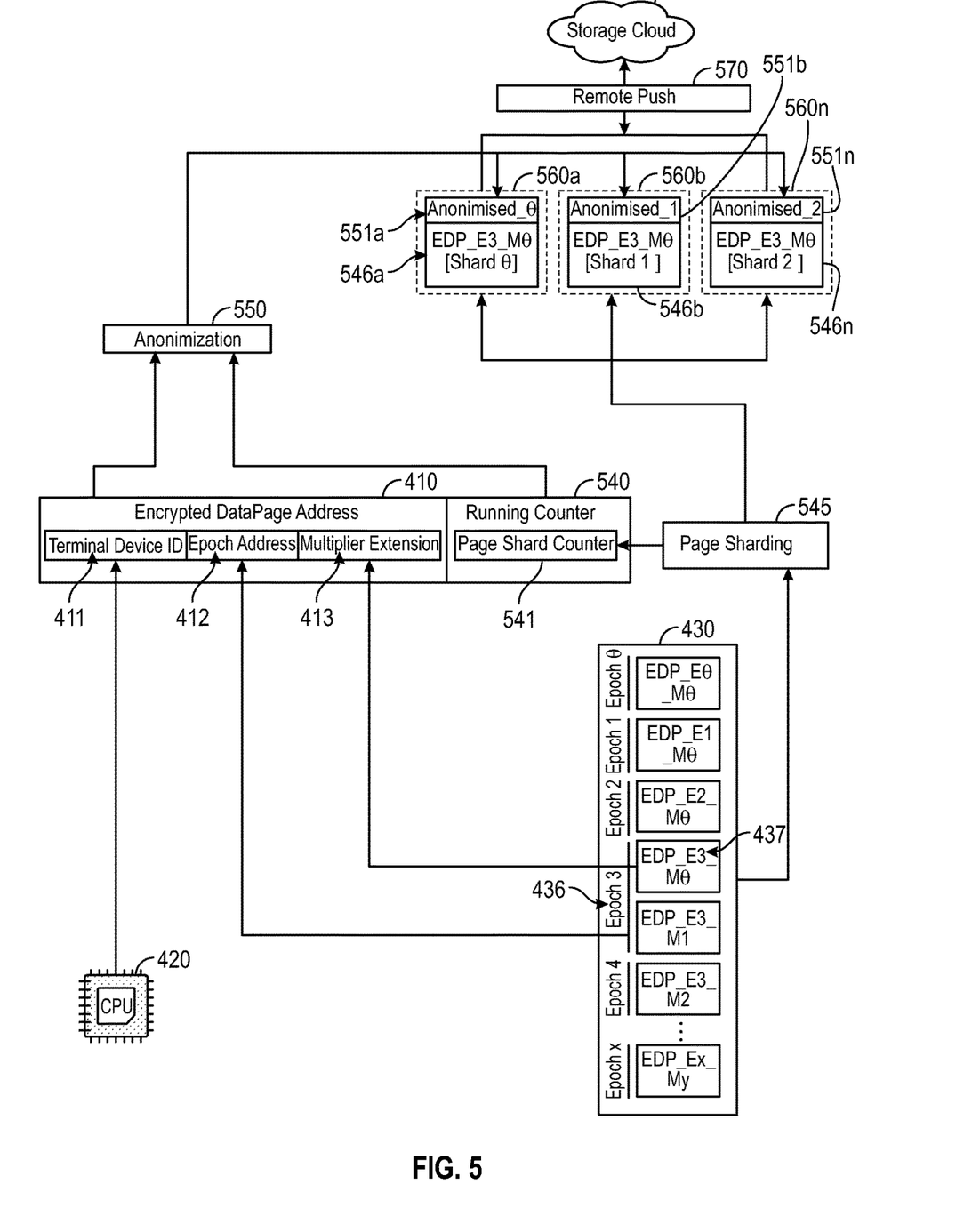
FIG. 5 is an illustrative block diagram showing additional details of page sharding, anonymization, and push block 330 of FIG. 3 according to an embodiment.

FIG. 5 is an illustrative block diagram showing additional details of page sharding, anonymization, and push block 330 of FIG. 3 according to an embodiment. As discussed above in connection with FIG. 3, the shard distribution scheme is operative to store historical data pages on remote servers to prevent and/or minimize the amount of leaked information during an attack. FIG. 5 includes blocks 410, 420, and 430 from FIG. 4 and adds running counter block 540, page sharding block 545, anonymization block 550, shard units 560a-n, remote push block 570, and storage cloud servers 580.

The shard distribution scheme operates as follows. A historical data page (e.g., encrypted data page 437) is selected for sharding and remote site storage. The encrypted data page address 410 of EDP 437 is reconstructed by obtaining terminal device ID 411, Epoch Address 412, and Multiplier Extension 413. Reconstructed address 410 is used as a constant for anonymization block 550 for the entire duration of the processing of EDP 437. Processing the encrypted data page 437 continues with page sharding block 545, which outputs a page shard count 541 for each data shard that page sharding block 545 generates. Page sharding block 545 can generate n number of data shards 546a-n based on EDP 437. The combination of data shards 546a-n, when reconstructed, would form EDP 437. Taken independently, data shards 546a-n cannot be used by an attacker, as any given shard does not possess binary information stored in other data shards.

Page shard count 541 represents an address extension that identifies the shard itself. Page shard count 541, together with the original constant address 410 of EDP 437, are inputs for the anonymization block 550. Anonymization block 550 converts the plaintext address of address 410 into an anonymized address that eliminates correlation among shards for an external observer/attacker. Anonymization block 550 can use a one-way cryptographic function such as a hashing algorithm, KDF, or other cryptographic constructions (e.g. polynomial-based LUTs/S-boxes). The result is prepended to respective shards 545a-n as anonymized addresses 551a-n. The combination of respective data shard 546a-n and anonymized addresses 551a-n form shard units 560a-n. Shard units 560a-n are sent to storage cloud servers 580 using the remote push block 570. Remote push block 570 can utilize a list of available peers—either statically available or involving a peer discovery protocol—to randomly pick a subset of peers to store shard units 560a-n. Shard units 560a-n can be addressed via their respective anonymous addresses 551a-n.

Figure 6:
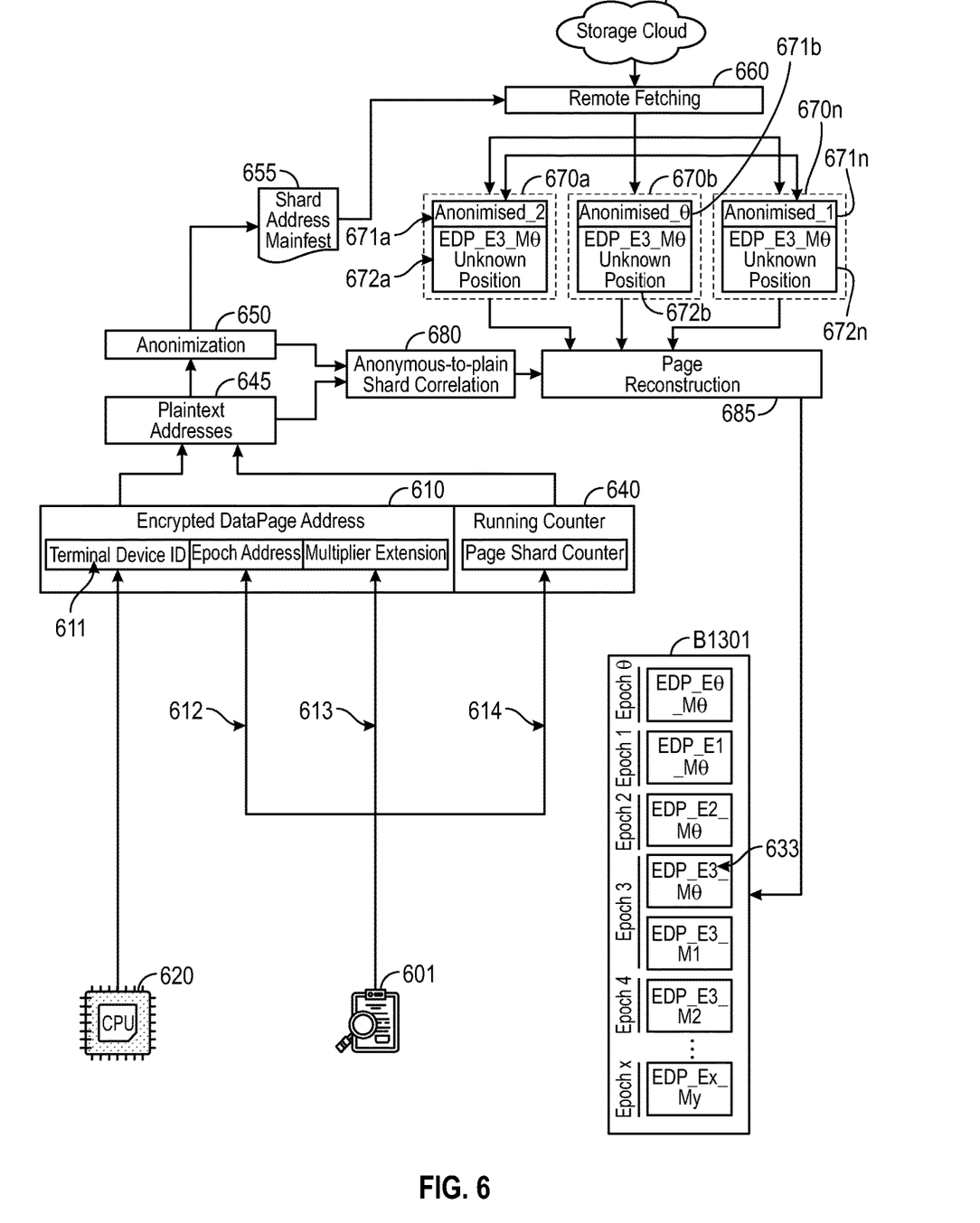
FIG. 6 is an illustrative block diagram showing additional details of shard fetching and page reconstruction block 370 of FIG. 3 according to an embodiment.

FIG. 6 is an illustrative block diagram showing additional details of shard fetching and page reconstruction block 370 of FIG. 3 according to an embodiment. FIG. 6 shows a reverse operation of that shown in FIG. 5 by specifying how stored shard units are retrieved from remote locations and locally reassembled as encrypted data pages. FIG. 6 shows that in "normal" conditions, the stored shard units are accessible to a terminal device user (e.g., when panic mode is not activated). In an "abnormal" condition (e.g., when panic mode is active), the stored shard units are not accessible to a terminal device user.

Assume a user is using a terminal device to query a historical entry, specifically in this example, EDP_E3_M0 633. The terminal searches for EDP 633 locally, and after failing to find it, the terminal creates query 601 for the desired data page. Query 633 can include the epoch address 612, multiplier extension 613, and page shard count 614. Page shard count 614 is initialized to count a fixed number, depending on the sharding granularity. Device 620 can provide the constant device-specific and system-unique identifier, terminal device ID 611. Terminal device ID 611, epoch address 612, and multiplier extension 613 are used to identify encrypted data page address 610, and address 610 remains a constant part of the address space for the currently queried EPD 633, while the running counter 640 creates n extensions of address 610. The combination of all n addresses constitute plaintext addresses 645, which are known only to the terminal device. Plaintext addresses are anonymized through anonymization block 650 and stored into shard address manifest 655. Manifest 655 is input to remote fetching block 660. Block 660 may query the remote servers or storage peers in storage cloud 665 to fetch the stored shard units indicated in manifest 655. Block 660 can utilize a list of available peers—either statically available or involving a peer discovery protocol—to query all of them based on the shard address manifest 655. Storage peers that contain stored shard units as identified in manifest 655 can send them to the requesting terminal device, provided those storage peers are not in panic mode. The fetched shards provided by the remote peers are represented by boxes 670a-n. Each fetched shard 670a-n includes respective anonymized address 671a-n and data shard 672a-n.

Plaintext addresses 645 and anonymized addresses 650 are used to create a client-side dynamic look up table (LUT) represented as anonymous-to-plain shard correlation block 680. Fetched shards 670a-n can originate from one or more remote locations, therefore the order in which they arrive may not be sequential. Page reconstruction block 685 may receive as inputs all fetched shard units 670a-n and the LUT provided by block 680 to correlate the anonymous addresses to the plaintext ones such that block 685 can place data shards 672a-n in the correct order to provide a reconstruction of encrypted data page 633.

Figure 7:
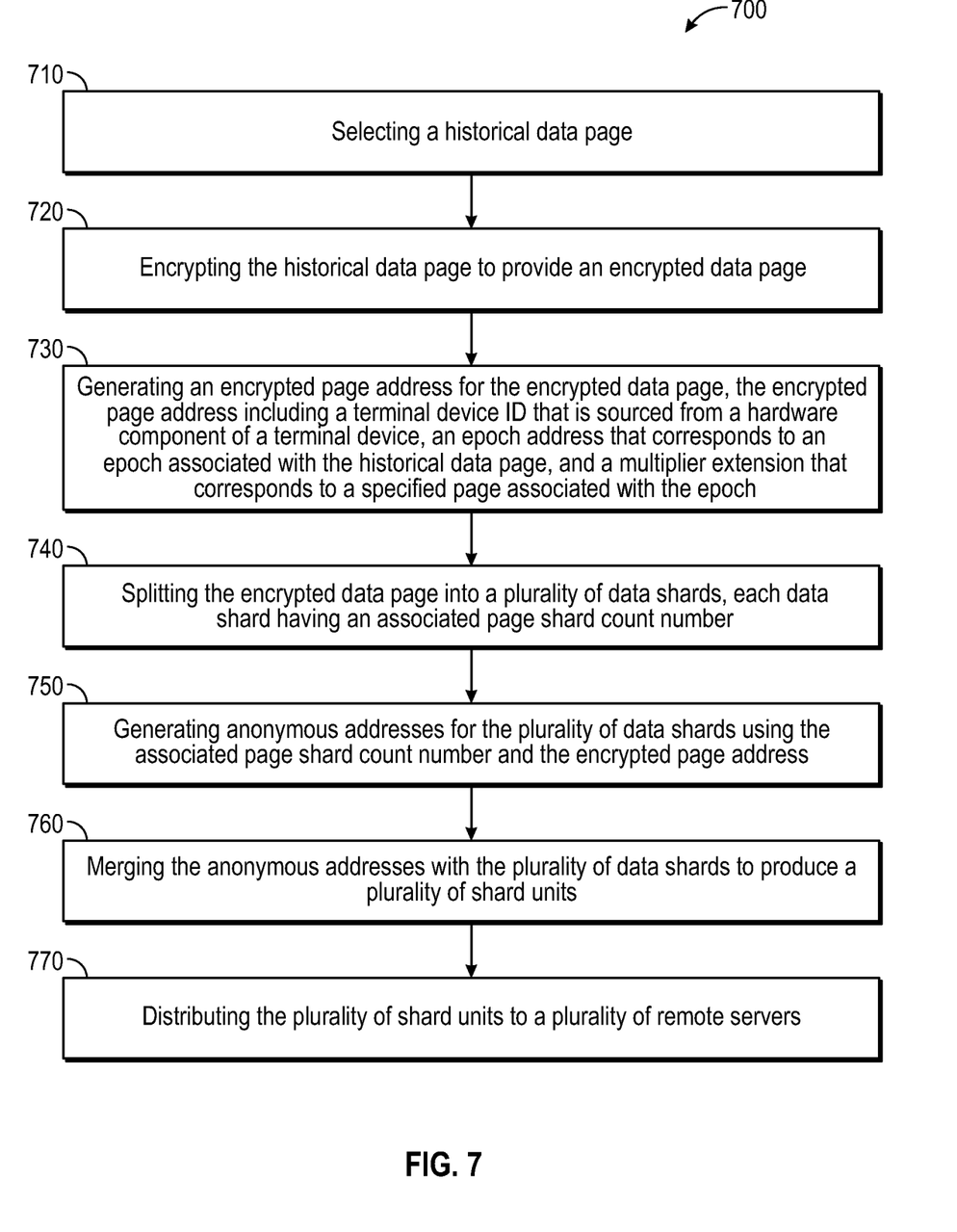
FIG. 7 shows illustrative process for distributing shard units according to an embodiment.

FIG. 7 shows illustrative process 700 for distributing shard units according to an embodiment. Starting at step 710, a historical data page can be selected. The selected historical data page can be encrypted to provide an encrypted data page at step 720. At step 730, an encrypted page address can be generated for the encrypted data page, the encrypted page address including a terminal device ID that is sourced from a hardware component of a terminal device, an epoch address that corresponds to the historical data page, and a multiplier extension that corresponds to a specified page associated with the epoch. At step 740, the encrypted page can be split into a plurality of data shards, each data shard having an associated page shard count number. Anonymous addresses can be generated for the plurality of data shards using the associated page shard count number and the encrypted page address, at step 750. The anonymous addresses can be merged with the plurality of data shards to produce a plurality of shard units, at step 760. The plurality of shard units can be distributed to a plurality of remote servers at step 770.

It should be understood that the steps shown in FIG. 7 are merely illustrative that additional steps may be added, that the order of the steps may be rearranged, and that some steps may be omitted. For example, the historical data page may have been previously encrypted, thereby eliminating the need for step 720.

Figure 8:
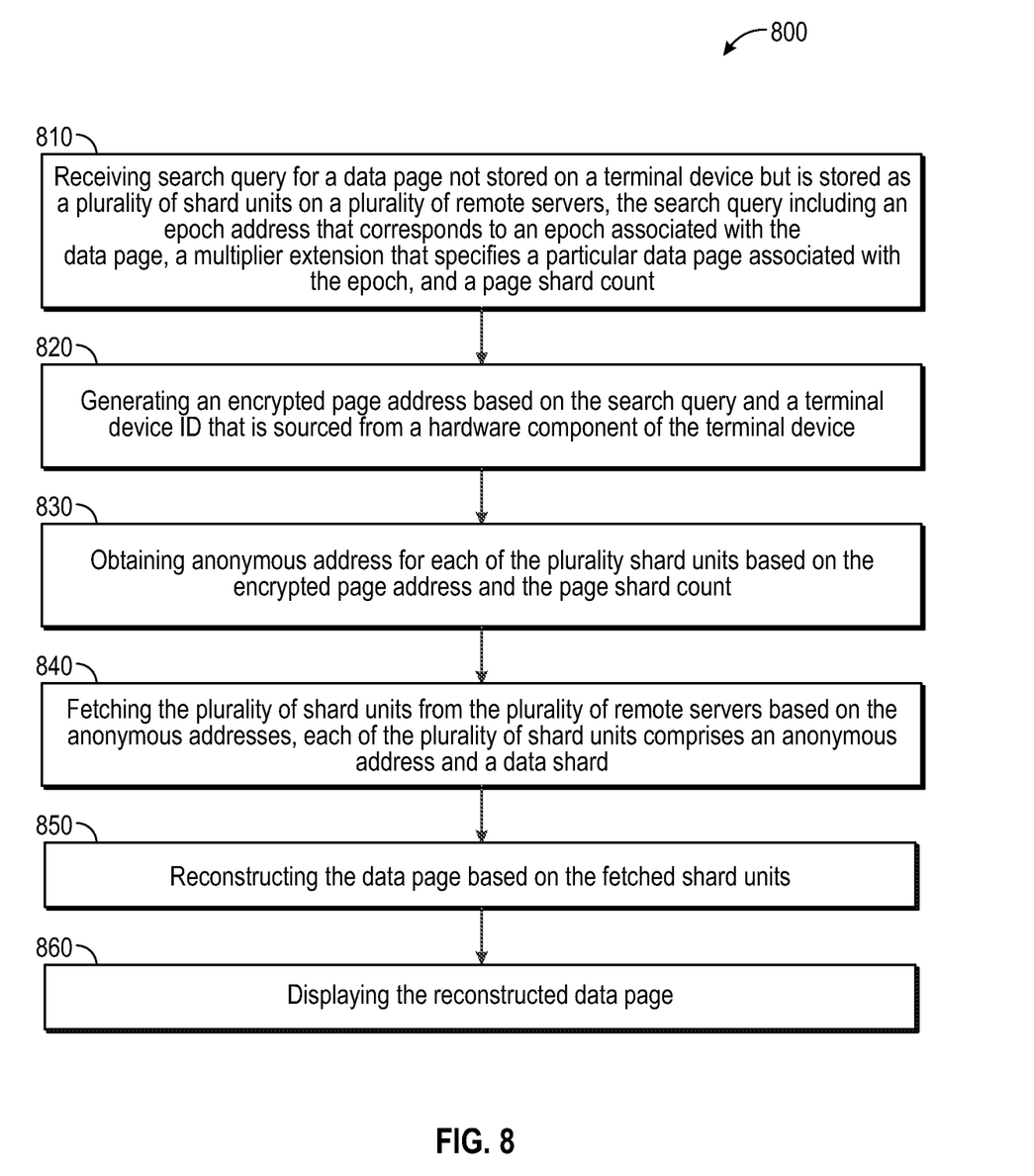
FIG. 8 shows illustrative process for fetching shard units according to an embodiment.

FIG. 8 shows illustrative process 800 for fetching shard units according to an embodiment. Starting at step 810, a search query can be received for a data page not stored on a terminal device but is stored as a plurality of shard units on a plurality of remote servers, the search query including an epoch address that corresponds to an epoch associated with the data page, a multiplier extension that specifies a particular data page associated within the epoch, and a page shard count. At step 820, an encrypted page address can be generated based on the search query and a terminal device ID that is sourced from a hardware component of the terminal device. At step 830, anonymous addresses can be obtained for each of the plurality shard units based on the encrypted page address and the page shard count. At step 840, the plurality of shard units can be fetched from the plurality of remote servers based on the anonymous addresses, each of the plurality of shard units comprises an anonymous address and a data shard. The data page can be reconstructed based on the fetched shard units at step 850, and displayed at step 860.

It should be understood that the steps shown in FIG. 8 are merely illustrative that additional steps may be added, that the order of the steps may be rearranged, and that some steps may be omitted.

Figure 9:
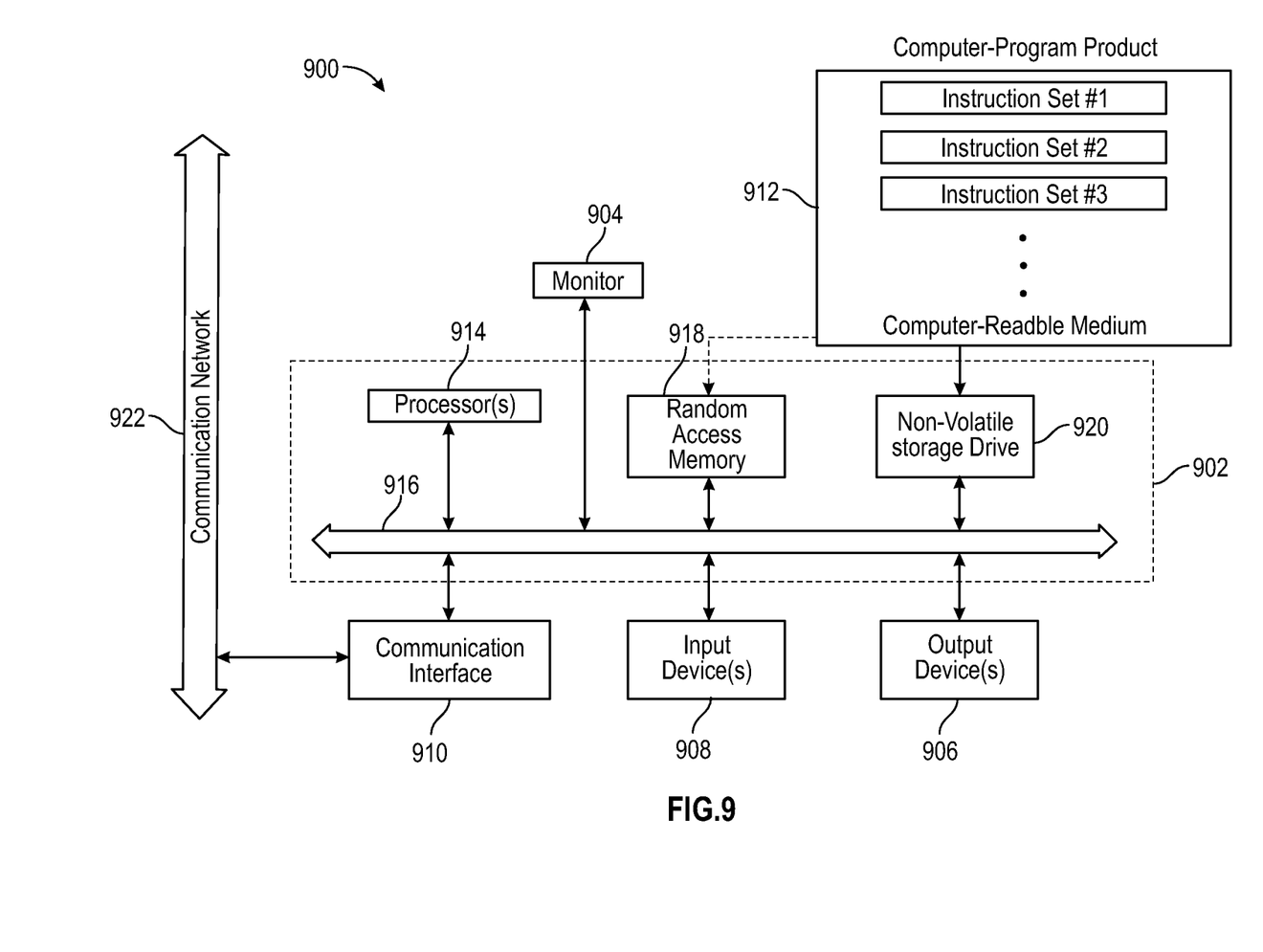
FIG. 9 is a block diagram of a special-purpose computer system according to an embodiment.

FIG. 9 is a block diagram of a special-purpose computer system 900 according to an embodiment. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 900 comprises a computer 902, a monitor 104 coupled to computer 902, one or more additional user output devices 906 (optional) coupled to computer 902, one or more user input devices 908 (e.g., keyboard, mouse, track ball, touch screen) coupled to computer 902, an optional communications interface 910 coupled to computer 902, and a computer-program product including a tangible computer-readable storage medium 912 in or accessible to computer 902. Instructions stored on computer-readable storage medium 912 may direct system 900 to perform the methods and processes described herein. Computer 902 may include one or more processors 914 that communicate with a number of peripheral devices via a bus subsystem 916. These peripheral devices may include user output device(s) 906, user input device(s) 908, communications interface 910, and a storage subsystem, such as random access memory (RAM) 918 and non-volatile storage drive 920 (e.g., disk drive, optical drive, solid state drive), which are forms of tangible computer-readable memory.

Computer-readable medium 912 may be loaded into random access memory 918, stored in non-volatile storage drive 920, or otherwise accessible to one or more components of computer 902. Each processor 914 may comprise a microprocessor, such as a microprocessor from Intel® or Advanced Micro Devices, Inc.®, or the like. To support computer-readable medium 912, the computer 902 runs an operating system that handles the communications between computer-readable medium 912 and the above-noted components, as well as the communications between the above-noted components in support of the computer-readable medium 912. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 908 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 908 are typically embodied as a computer mouse, a trackball, a track pad, a joystick, wireless remote, a drawing tablet, a voice command system. User input devices 908 typically allow a user to select objects, icons, text and the like that appear on the monitor 904 via a command such as a click of a button or the like. User output devices 906 include all possible types of devices and mechanisms to output information from computer 902. These may include a display (e.g., monitor 904), printers, non-visual displays such as audio output devices, etc.

Communications interface 910 provides an interface to other communication networks and devices and may serve as an interface to receive data from and transmit data to other systems, WANs and/or the Internet, via a wired or wireless communication network 922. Embodiments of communications interface 910 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 910 may be coupled to a computer network, to a FireWire® bus, or the like. In other embodiments, communications interface 910 may be physically integrated on the motherboard of computer 902, and/or may be a software program, or the like.

RAM 918 and non-volatile storage drive 920 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 918 and non-volatile storage drive 920 may be configured to store the basic programming and data constructs that provide the functionality of various embodiments of the present invention, as described above.

Software instruction sets that provide the functionality of the present invention may be stored in computer-readable medium 912, RAM 918, and/or non-volatile storage drive 920. These instruction sets or code may be executed by the processor(s) 914. Computer-readable medium 912, RAM 918, and/or non-volatile storage drive 920 may also provide a repository to store data and data structures used in accordance with the present invention. RAM 918 and non-volatile storage drive 920 may include a number of memories including a main random access memory (RAM) to store instructions and data during program execution and a read-only memory (ROM) in which fixed instructions are stored. RAM 918 and non-volatile storage drive 920 may include a file storage subsystem providing persistent (non-volatile) storage of program and/or data files. RAM 918 and non-volatile storage drive 920 may also include removable storage systems, such as removable flash memory.

Bus subsystem 916 provides a mechanism to allow the various components and subsystems of computer 902 communicate with each other as intended. Although bus subsystem 916 is shown schematically as a single bus, alternative embodiments of the bus subsystem may utilize multiple busses or communication paths within the computer 902.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

Moreover, the processes described with respect to one or more of FIGS. 1-9, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A computer-readable storage medium containing program instructions for a method being executed by an application, the application comprising code for one or more components that are called by the application during runtime, wherein execution of the program instructions by one or more processors of a computer system causes the one or more processors to perform steps comprising:
   selecting an encrypted data page;
   generating an encrypted data page address for the encrypted data page, the encrypted data page address comprising:

a terminal device ID that is sourced from a hardware component of a terminal device;
an epoch address that corresponds to an epoch associated with the encrypted data page; and
a multiplier extension that corresponds to a specified page associated with the epoch;
splitting the encrypted data page into a plurality of data shards, each data shard having an associated page shard count number;
generating anonymous addresses for the plurality of data shards using the associated page shard count number and the encrypted page address; and
merging the anonymous addresses with the plurality of data shards to produce a plurality of shard units.

2. The computer readable storage medium of claim 1, the method further comprising distributing the plurality of shard units to a plurality of remote servers.

3. The computer readable storage medium of claim 2, wherein the shard units stored on the plurality of remote servers are inaccessible during an active panic mode.

4. The computer readable storage medium of claim 1, wherein the encrypted data page contains communications data records derived from a terminal device within the system, wherein the communications data records are arranged in a communication stream time order, and wherein the epoch associated with the encrypted data page has a particular epoch timeframe having a start time and an end time within the communication stream time order.

5. The computer readable storage medium of claim 4, wherein the encrypted data page is one a plurality of is one of a plurality of historical data pages that have been split according to a shard distribution scheme and stored as shard units in the plurality of remote servers.

6. The computer readable storage medium of claim 4, wherein a portion of the communications data records are included in a current data page that is stored on the terminal device.

7. The computer readable storage medium of claim 6, wherein the current data page contains the only communication data records that can be compromised during an attack.

8. The computer readable storage medium of claim 6, wherein the current data page transitions to become one of the historical data pages.

9. A method comprising:
selecting an encrypted data page;
generating an encrypted data page address for the encrypted data page, the encrypted data page address comprising:
a terminal device ID that is sourced from a hardware component of a terminal device;
an epoch address that corresponds to an epoch associated with the encrypted data page; and
a multiplier extension that corresponds to a specified page associated with the epoch;
splitting the encrypted data page into a plurality of data shards, each data shard having an associated page shard count number;
generating anonymous addresses for the plurality of data shards using the associated page shard count number and the encrypted page address; and
merging the anonymous addresses with the plurality of data shards to produce a plurality of shard units.

10. The method of claim 9, further comprising distributing the plurality of shard units to a plurality of remote servers.

11. The method of claim 10, wherein the shard units stored on the plurality of remote servers are inaccessible during an active panic mode.

12. The method claim 9, wherein the encrypted data page contains communications data records derived from a terminal device within the system, wherein the communications data records are arranged in a communication stream time order, and wherein the epoch associated with the encrypted data page has a particular epoch timeframe having a start time and an end time within the communication stream time order.

13. The method of claim 12, wherein the encrypted data page is one a plurality of is one of a plurality of historical data pages that have been split according to a shard distribution scheme and stored as shard units in the plurality of remote servers.

14. The method of claim 12, wherein a portion of the communications data records are included in a current data page that is stored on the terminal device.

15. The method of claim 14, wherein the current data page contains the only communication data records that can be compromised during an attack.

16. The method of claim 14, wherein the current data page transitions to become one of the historical data pages.

* * * * *